April 19, 1960

C. M. HINES 2,933,350

ELECTRO-PNEUMATIC AND DYNAMIC BRAKE APPARATUS

Filed June 28, 1956

INVENTOR.
CLAUDE M. HINES
BY
ATTORNEY

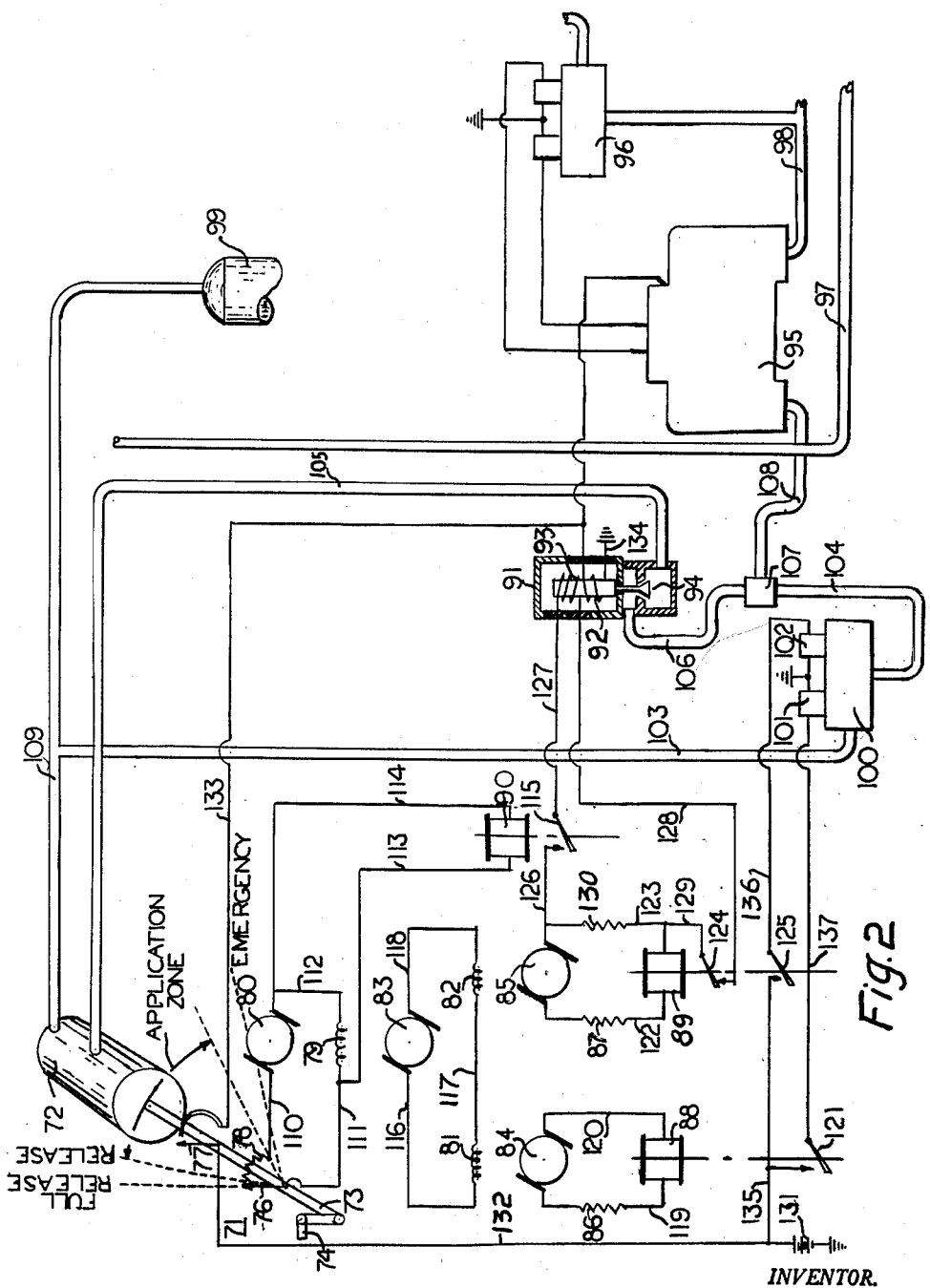

United States Patent Office 2,933,350
Patented Apr. 19, 1960

2,933,350

ELECTRO-PNEUMATIC AND DYNAMIC BRAKE APPARATUS

Claude M. Hines, Verona, Pa., assignor to Westinghouse Air Brake Company, Wilmerding, Pa., a corporation of Pennsylvania Application June 28, 1956, Serial No. 594,597

6 Claims. (Cl. 303—3)

This invention relates to combined electro-pneumatic and dynamic brake apparatus for railroad vehicles, such as diesel locomotives, and more particularly to means comprised in such apparatus, for automatically effecting operation of the electro-pneumatic brake in response to operation of the dynamic brake beyond predetermined limits of a vehicle speed range.

The well-known use of the vehicle driving motors and control mechanisms for connecting the said motors in a dynamic braking circuit is efficient and economic but it is limited to operation within a speed range well below maximum speed and well above minimum speed of the vehicle. Because the effectiveness of the dynamic brakes diminishes at some low critical speed of the vehicle, it is necessary to provide a supplemental braking means to assist the retardation effect of the dynamic brakes. Above a certain critical speed the use of the dynamic brakes may be very harmful to the vehicle motors due to excessive current being generated therein and the overheating effected. Accordingly, a supplemental braking means is necessary to assist the dynamic brakes in reducing the vehicle speed below said critical speed.

It is the principal object of this invention to provide means to automatically supplement the dynamic brake with an electro-pneumatic brake.

It is another object of this invention to provide a combined dynamic and electro-pneumatic brake apparatus comprising means which will automatically render the electro-pneumatic brake effective upon a certain substantial decrease in braking effect of the dynamic brake due to a decreasing low speed and also effective upon decrease in the rate of deceleration of the vehicle effected by the dynamic brake on a downgrade at high speeds.

It is a further object of the invention to provide a combined dynamic and electro-pneumatic brake apparatus comprising means which will automatically render the electro-pneumatic brake effective when the vehicle speed exceeds a certain predetermined speed to supplement the dynamic braking effect.

It is still another object of the invention to provide a combined dynamic and electro-pneumatic brake apparatus comprising means which will automatically render the electro-pneumatic brake effective under the control of a brake valve to supplement the dynamic braking when the vehicle exceeds a first predetermined high speed and automatically renders the maximum available electro-pneumatic brake effective to supplement the dynamic braking when the vehicle exceeds a second predetermined speed higher in degree than said first predetermined high speed.

Other objects and advantages of the invention will become apparent from the following more detailed description taken in connection with the accompanying drawings in which:

Fig. 2 is a diagrammatic and schematic view of another embodiment of the invention adapted for use on railroad vehicles, such as diesel-electric locomotives.

*Description—Fig. 1*

Figure 1:
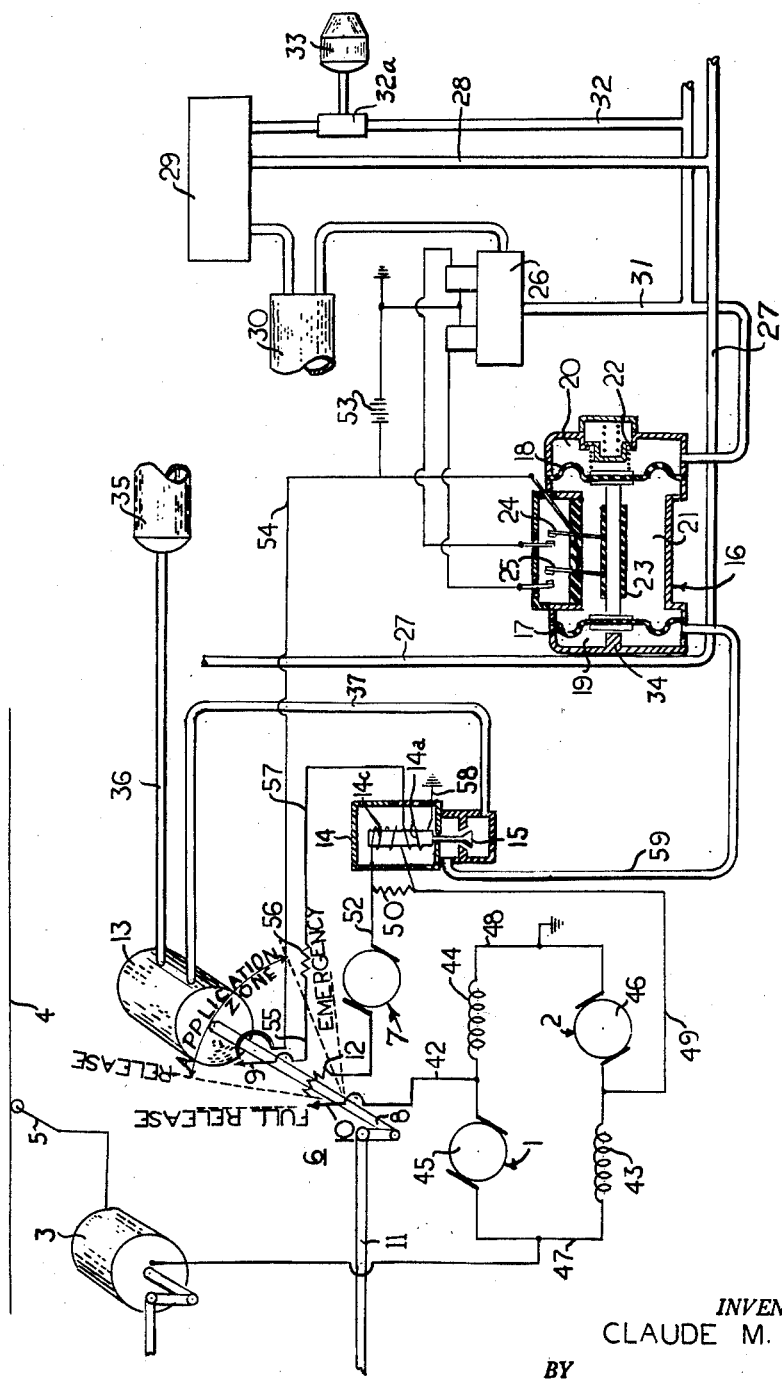
Fig. 1 is a diagrammatic and schematic view of one embodiment of the invention adapted for use on street railway vehicles such as the well-known PCC trolley car.

Referring to Fig. 1, in which there is shown a simplified form of combined electro-pneumatic and dynamic brake such as may be employed on electrically propelled vehicles with conventional electro-pneumatic brake equipment, the vehicle has two traction motors 1 and 2 which are connected to driving axles (not shown). These traction motors, when supplied with electrical energy, act to propel the vehicle; and, when not supplied with such energy and when properly controlled, the same motors act as electric generators for dynamic braking of the car. The supply of electrical energy to the traction motors when used to propel the vehicle is controlled by a manually operated power controller 3 which regulates the energy derived from a trolley wire 4 and trolley 5. Operation of the power controller is effected by hand lever or foot pedal (not shown). For simplicity only such basic elements of the propulsion control as are necessary to an understanding of the present invention are described herein.

Each motor circuit comprises an armature and a series field winding, said motor circuits being connected in parallel with each other in an electric circuit which includes a dynamic brake controller 6. The dynamic brake controller 6 controls excitation of the respective motor field windings by the current from the trolley wire or as shown herein as the current output of a generator 7 to cause generation of a dynamic braking current corresponding to the degree of angular rotary movement of said controller 6 as will be explained. The resultant energy generated by the armatures of the motors 1 and 2 when used as a dynamic brake is dissipated in the form of heat as will be explained.

The dynamic brake controller 6 comprises a rotary cam shaft 8 for effecting operation of cam operated switches represented on the drawings by switches 9 and 10. Cam shaft 8 rotates in response to movement of a mechanical linkage 11 which in turn is connected to a hand lever or foot pedal (not shown). Rotation of the cam shaft 8 varies the amount of resistance represented on the drawing by variable resistor 12 in the dynamic braking circuit to regulate the current from generator 7 through the field windings of the traction motors acting as generators and thereby controls the torque required to turn the respective armatures, hence controlling the degree of dynamic braking.

Mounted on an extension of the cam shaft 8 and operated simultaneously with the controller 6 is a brake valve 13 of the self-lapping type such as that shown in Patent No. 2,042,112 issued to E. K. Lynch et al. assigned to the assignee of this invention. This brake valve when operated initiates electro-pneumatic braking in increasing degree as the cam shaft 8 is rotated out of release position into the application zone as indicated on the drawings.

A compensating magnet valve device 14 is provided comprising an exciter coil 14a and a compensating coil 14c operable when both of said windings are energized by a sufficient degree of current to cause pick-up or closure of a magnet operated valve 15. Energization of the exciter coil 14a only is accomplished by current from a battery source explained hereinafter and is of insufficient degree to effect closure of said magnet operated valve 15. Energization of the compensating coil 14c is accomplished by dynamic braking current, the said coil being an integrant of the dynamic braking circuit. When the compensating coil 14c is energized to a sufficient degree, commensurate with an effective application of dynamic braking, the combined effect of the energized exciter coil 14a and energized compensating coil 14c is of sufficient degree to cause closure of the magnet operated valve 15 to prevent flow of fluid under pressure to the electro-pneumatic braking equipment such that the dynamic braking means only is effective to retard the vehicle.

Included in the electro-pneumatic braking equipment is a standard self-lapping type of master controller switch 16 hereinafter referred to as the master controller 16. The master controller 16 is comprised of a diaphragm assembly including two diaphragms 17 and 18 to define a control chamber 19, a self-lapping chamber 20 and a contact chamber 21. A self-lapping caged spring assembly 22 is included in the self-lapping chamber 20 to assist in the well-known self-lapping operation of such a master controller. The contact chamber 21 contains a diaphragm follower 23 for positioning a release contact 24 and an application contact 25. Supply of fluid under pressure to the control chamber 19 causes the diaphragms 17, 18, and follower 23 to move to the right to first cause the release contact 24 to close and then cause the application contact 25 to close. The contacts 24 and 25 control operation of application and release magnet device 26 to effect a brake application or release, as hereinafter explained. The internal structure of the magnet valve device 26 is similar to that shown as magnet valve device 6 in the Hines Patent 2,725,260, issued November 29, 1955 and assigned to the assignee of the present invention.

Operation of the electro-pneumatic braking equipment is effected in the well-known manner by supplying fluid under pressure to an auxiliary reservoir 30 under the control of the application and release magnet valve device 26 to a straight-air pipe 31 from which in turn fluid under pressure is supplied via a branch pipe 32 and past a double check valve 32a to a brake cylinder 33 to apply the vehicle brakes. The application and release magnet device 26 operates such that with the master controller release contact 24 alone being closed, an atmospheric port (not shown) within said device is closed to prevent venting of the straight-air pipe 31 and connected chamber 20 (lap position). With both the application and release contacts 24 and 25 of the master controller 16 closed, the aforesaid atmospheric port is closed and a delivery port (not shown) is opened to permit delivery of fluid under pressure from the auxiliary reservoir 30 to the straight-air pipe 31, chamber 20, and the connected brake cylinder 33 to effect a brake application. With both contacts 24 and 25 opened, the aforesaid delivery port is closed and the aforesaid atmospheric port is opened to vent chamber 20, the straight-air pipe 31, and connected brake cylinder 33 to effect a brake release. When the pressure of fluid in the self-lapping chamber 20 of the master controller 16 is equal to the pressure of fluid in control chamber 19, the spring assembly 22 will cause the diaphragm assembly to move a slight distance to the left to a lap position in which position the release contact 24 is closed and the application contact 25 is opened. Venting of fluid under pressure from control chamber 19 will permit the spring assembly 22 to move the diaphragm assembly to the extreme left in a release position as defined by a stop 34 in which position both the release contact 24 and application contact 25 are opened. The auxiliary reservoir 30 is charged with fluid under pressure from the brake pipe 27 via a branch pipe 28 and a control valve 29, under the control of a separate well-known type automatic brake valve (not shown) on the locomotive. The control valve 29 is of the well-known D-22 type similar to that shown in Patent 2,152,257 of Hewett et al. issued March 28, 1939 and assigned to the assignee of the present invention.

*Operation—Fig. 1*

To operate the apparatus shown in Fig. 1 when the vehicle is in motion and a brake application is desired, the propulsion controller 3 is moved to a non-propulsion position and a brake application initiated by movement of a brake pedal or handle (not shown) which in turn effects movement of the mechanical linkage 11 to effect rotation of cam shaft 8. Rotation of the cam shaft 8 from a release position into an application zone as indicated by the dotted lines on the drawing, effects operation of the brake valve 13 to supply fluid under pressure from a main reservoir 35 via a pipe 36 to the brake valve 13 and thence to pipe 37 and the compensating magnet operated valve device 14 in an amount corresponding to the degree of rotation of shaft 8 into the application zone. Simultaneously rotation of the cam shaft 8 into the application zone causes three separate operations of the dynamic brake controller 6 as follows: first, a cam operated switch shown in the drawing as switch 9 is closed to complete a circuit (to be described) for energizing the exciter coil 14a of the compensating magnet valve device 14; secondly, another cam operated switch shown in the drawing as switch 10 is closed to complete a dynamic braking circuit (to be described); and thirdly, said rotation of cam shaft 8 causes the switch 10 to be positioned on the resistor 12 such as to vary the amount of said resistor 12 in the dynamic braking circuit in proportion to the degree of rotation of said cam shaft 8 out of the brake release position. It can be seen from the drawing that the switches 9 and 10 remain closed while the cam shaft 8 is in the application zone and are both opened when the cam shaft 8 is in release position.

The dynamic braking circuit includes the generator 7, resistor 12, wire 42 to the two parallel motor circuits including the motor field windings 43 and 44 and armature windings 45 and 46 connected respectively by the wires 47 and 48, wire 49, heat dissipating resistor 50 with the compensating coil 14c of the compensating magnet valve device 14 connected in parallel therewith, and wire 52 to the generator 7.

Decreasing the amount of resistor 12 in the dynamic brake circuit, as caused by rotation of cam shaft 8 into the application zone, results in increasing the degree of excitation of the field windings 43 and 44 of the respective traction driven motors 1 and 2 by the output of the generator 7. With the traction motor field windings 43 and 44 separately excited as just described, the traction motors 1 and 2 act as separately excited generators driven by the kinetic energy of the vehicle, the output of the traction motor armatures 45 and 46 (referred to hereinafter as the dynamic braking current) being proportionate to the degree of excitation of field windings 43 and 44. An increased amount of excitation of the field windings 43 and 44 results in an increase of dynamic braking current and corespondingly, said increase in amount of field winding excitation requires an increase in the kinetic energy of the vehicle needed to operate the traction motors 1 and 2, such increased kinetic energy requirement resulting in an increased effective dynamic braking.

The exciter coil 14a of the compensating magnet valve device 14 is energized when the cam shaft 8 is in the application zone due to closing of switch 9 to complete a circuit from a battery 53 through wire 54, switch 9, wire 55, current limiting resistor 56, wire 57, and the exciter coil 14a to ground wire 58. The energization of the exciter coil 14a by the circuit just described is not of sufficient degree to cause the compensating magnet operated valve 15 to close and thus fluid under pressure in pipe 37 is permitted to flow past said compensating magnet operated valve 15 to a control pipe 59 and thence to the control chamber 19 of the master controller 16 to effect a degree of electro-pneumatic braking as determined by the degree of rotation of the cam shaft 8 into the application zone.

Simultaneous with the energization of the exciter coil 14a, due to the clockwise rotation of cam shaft 8 into the application zone, a dynamic braking current is generated in the dynamic braking circuit including the compensating coil 14c as previously described. As the dynamic braking increases, the dynamic braking current likewise increases to a predetermined degree at which the compensating coil 14c is energized sufficiently to cooperate with the energized exciter coil 14a to cause the compensating magnet operated valve 15 to close to cut off flow of fluid under pressure from pipe 37 to the control pipe 59. When the compensating magnet operated valve 15 is closed, the degree of electro-pneumatic braking effective at the time of said closure remains effective due to the fluid under pressure in control pipe 59 and control chamber 19 of the master controller 16, however, the degree of electro-pneumatic braking cannot be increased beyond that degree present and any increased braking effect must result from the dynamic braking means.

It can thus be seen that as the cam shaft 8 is rotated into the application zone, both dynamic braking and electro-pneumatic braking are applicable to cause a combined total braking effect until a degree at which the dynamic braking current is sufficient to cause closing of the compensating magnet operated valve 15 to limit the effective electro-pneumatic braking, and increased braking effect can only be resultant from increased dynamic braking as caused by increased rotation of cam shaft 8 into the application zone. In the event of extremely high speeds where dynamic braking may prove harmful to the traction motors and it is desirous to nullify the effect of the compensating magnet operated valve 15 and obtain additional emergency electro-pneumatic braking instead of increased dynamic braking, the switch 10 on the cam shaft 8 is rotated clockwise out of contact with the variable resistor 12 into an emergency zone. With the switch 10 open in the emergency zone, the dynamic braking circuit is opened such that the compensating coil 14c is de-energized and the compensating magnet operated valve 15 opened to enable increased emergency fluid pressures as controlled by brake valve 13 to flow from pipe 37 to control pipe 59 to effect an emergency electro-pneumatic braking effect.

Brake release is obtained in exactly reverse order as the operation just described for brake application, that is: the cam shaft 8 is rotated counterclockwise out of the application zone thereby causing decreasing dynamic braking and correspondingly decreasing dynamic braking current to a degree such that the energization of the compensating coil 14c is insufficient to maintain the compensating magnet operated valve 15 closed. When dynamic braking current decreases to the just described degree, the compensating magnet operated valve 15 will open to permit fluid under pressure from the control pipe 59 to flow to the pipe 37 and thence vented in a usual manner to atmosphere through the self-lapping brake valve 13 as counterclockwise rotation of said cam shaft 8 continues, thereby releasing electro-pneumatic brakes simultaneously with the decreasing dynamic braking.

*Description—Fig. 2*

In Fig. 2 there is shown a simplified form of a combined electro-pneumatic and dynamic brake such as would be employed on a diesel electric locomotive. In normal power operation of a diesel electric locomotive, a diesel engine drives a direct current main generator and auxiliary generators. The current from the main generator is fed into series wound traction motors that drive the wheels of the locomotive through gear arrangements. Dynamic braking is accomplished by having the traction motors driven by the kinetic energy of the vehicle. When dynamic braking is in effect, the power circuits are arranged such that the traction motor field windings are disconnected from their armatures, connected in series, and placed across the main generator armature. The traction motor armatures are connected to heat dissipating resistors, and the field windings of the main generator are connected in series and energized by current from the diesel-driven auxiliary generator armature under control of the dynamic brake controller. The power circuits as shown in Fig. 2 are shown connected as is necessary for dynamic braking. The dynamic brake controller 71 and brake valve 72 are operated simultaneously on a common cam shaft 73 which is operated by a brake lever or foot pedal (not shown) through means of a mechanical linkage 74 in a manner similar to that described in the operation of the dynamic controller 6 and brake valve 13 of Fig. 1. The dynamic brake controller 71 of Fig. 2 is similar to the dynamic brake controller 6 shown in Fig. 1, including rotary cam shaft 73 for effecting operation of cam operated switches 76 and 77 in a manner explained hereinafter. Rotation of cam shaft 73 controls a variable resistor 78 (similar to resistor 12 of Fig. 1) to regulate the degree of energization of the main generator field winding 79 as supplied by the auxiliary generator 80. Energization of the main generator field winding 79 causes the diesel-engine driven main generator to operate to effect excitation of the traction motor field windings 81 and 82 from the main generator armature 83. Excitation of the traction motor field windings 81 and 82 when the traction motors are driven by the kinetic energy of the vehicle causes the traction motors to operate as generators thereby creating a dynamic braking effect. The energy developed by the traction motor armatures 84 and 85 is dissipated in the form of heat through resistors 86 and 87. Current responsive relays 88 and 89 are connected in series with the respective traction motor armature circuits and adjusted such that they will pick up at a predetermined current supplied when said traction motor armatures are rotating at a chosen speed during dynamic braking.

Connected in parallel with the main generator field winding 79 is a relay 90 adapted to be energized when the main generator field winding 79 is energized during dynamic braking. A compensating magnet valve device 91 is provided, having an exciter coil 92 and a compensating coil 93 for controlling operation of a magnet operated valve 94, which operates in a manner similar to the compensating magnet valve device 14 of Fig. 1, to control the degree of electro-pneumatic braking applied during a brake application.

The electro-pneumatic brake equipment shown in Fig. 2 is similar to that shown in Fig. 1 except that the control valve, auxiliary reservoir, brake cylinder device and portions of the interconnecting piping are omitted but are to be understood to duplicate the respective elements shown on Fig. 1 as to construction and operation. Elements of the electro-pneumatic brake equipment shown in Fig. 2 are the usual well-known master controller device 95 similar in construction and operation to master controller 16 of Fig. 1, an application and release magnet device 96, a standard brake pipe 97 under the control of a separate automatic brake valve (not shown) on the locomotive, a straight-air pipe 98, the complete system being supplied with fluid under pressure from a main reservoir 99.

A separate control device 100 comprised of two magnet valves 101 and 102 is connected between the main reservoir 99 and the compensating magnet valve device 91 by pipes 103 and 104 for the purpose of assisting in the control of fluid under pressure to the master controller 95. The control device 100 is similar in structure to the standard application and release magnet valve device, an example of which is shown as magnet valve device 6 in Patent No. 2,725,260 of Hines issued November 29, 1955 and assigned to the assignee of the present invention. Fluid under pressure is supplied to the master controller 95 through two separate channels, one by way of pipe 105, past the compensating magnet operated valve 94, pipe 106, a double check valve 107, and a control pipe 108; and the second by way of pipe 103, control device 100, pipe 104, double check valve 107 and control pipe 108.

*Operation—Fig. 2*

To operate the apparatus shown in Fig. 2 when the vehicle is in motion and a brake application is desired, the propulsion controls (not shown) are conditioned in a non-propulsion position and a brake application is initiated by movement of the brake pedal or handle (not shown) which in turn effects movement of the mechanical linkage 74 to rotate the cam shaft 73 into the application zone. Rotation of the cam shaft 73 into the application zone causes simultaneous operation of the dynamic brake controller 71 and the brake valve 72 such that fluid under pressure is supplied from the main reservoir 99 via a pipe 109 to the brake valve 72 and thence to pipe 105 leading to the compensating magnet operated valve 94. The pressure of this fluid supplied to pipe 105 and the compensating magnet operated valve 94 is proportional to the degree of rotation of cam shaft 73 out of release position. Simultaneously with the supply of fluid under pressure to pipe 105, the dynamic brake controller 71 completes the circuit to energize the main generator field winding 79, said energization being in proportion to the degree of rotation of said cam shaft 73 out of release position. This circuit can be traced from the auxiliary generator armature 80 via wires 110, a portion of the variable resistor 78 in the dynamic brake controller 71 (said portion being determined by the positioning of switch 76 on the resistor 78), closed switch 76, wire 111, main generator field winding 79, and wire 112 to the auxiliary generator armature 80. Connected in parallel with the main generator field 79 by way of wires 113 and 114 is relay 90 having a single front contact 115. With relay 90 energized, front contact 115 thereof will be moved to its closed position to complete a circuit to the compensating coil 93 of the compensating magnet valve device 91 as will be explained hereinafter.

Energization of the diesel-engine driven main generator field winding 79 by the output of the auxiliary generator 80 results in current output from the diesel-engine driven main generator armature 83 which in turn energizes the traction motor field windings 81 and 82 by way of wires 116, 117, and 118. With the traction motor field windings 81 and 82 energized, the traction motors act as separately excited generators driven by the kinetic energy possessed by the moving train. The output of the traction motor armatures 84 and 85 depends on the field current supplied by the main generator armature 83 which in turn depends on the current supplied by the main generator field winding 79 controlled according to the position of switch 76 on the variable resistor 78 in the dynamic controller 71. A greater amount of excitation current fed to the traction motor field windings 81 and 82 results in an increase in the current that is dissipated across the heat dissipating resistors 86 and 87 of the respective motor circuits. A high degree of field excitation to the traction motor field windings 81 and 82 requires an increase in the power needed to turn the traction motors and such increase in power results in exertion of a greater braking effect on the vehicle.

Connected in series with the respective heat dissipating resistors 86 and 87 of the traction motor armatures 84 and 85 are the current responsive relays 88 and 89 respectively. Relay 88 being connected in the circuit of the traction motor armature 84 by wires 119 and 120, said relay having a single front contact 121. Relay 89 is connected in the circuit of the traction motor armature 85 by wires 122 and 123, said relay having a back contact 124 and a front contact 125. The compensating coil 93 is connected in the circuit of the traction motor armature 85 by way of wire 126, contact 115 of relay 90, wire 127, compensating coil 93, wire 128, contact 124 of relay 89 and wire 129, wire 123, relay 89, wire 122 and resistor 87 to the armature 85. A resistor 130 is placed in wire 123 to effect a voltage drop across said resistor such that the voltage applied to the compensating coil 93 is not an excessive amount such as would harm the compensating coil 93. The exciter coil 92 of the compensating magnet valve device 91 is energized by current supplied from the battery 131 by way of wire 132 to switch 77 of the dynamic brake controller 71 which is in its closed position when the cam shaft 73 is in the application zone, and thence to wire 133, exciter coil 92 and ground wire 134. Mere energization of the exciter coil 92 is not enough to cause the compensating magnet operated valve 94 to be picked up or moved to closed position. The compensating magnet operated valve 94 therefore, when the compensating coil 93 is deenergized, provides communication from pipe 105 to pipe 106, thence past double check valve 107 and through control pipe 108 to the master controller device 95; however, with movement of the cam shaft 73 into the application zone to effect dynamic braking, the compensating coil 93 is energized to cooperate with the exciter coil 92 and effect pick-up of the compensating magnet operated valve 94 to prevent the flow of fluid under pressure past said compensating magnet operated valve 94. Thus, the electro-pneumatic braking effective at the time the compensating magnet operated valve 94 closes remains effective but any increased braking can result only from dynamic braking apparatus. As the dynamic braking is increased by increasing the degree of rotation of said cam shaft 73 into the application zone to increase the current exciting the traction motor field windings 81 and 82, an increase in power is necessary to turn the traction motor armatures 84 and 85 thus increasing the dynamic braking effect.

In making a brake application on downgrades with a heavy or lengthy train, the effective braking resulting from the combined dynamic braking and limited electro-pneumatic braking (the electro-pneumatic braking effective at the time the magnet operated valve 94 closes) may be insufficient to slow the train and the train speed may increase to such a degree that the dynamic braking although still present, begins to lose its retardation effect. In the event of such an occurrence, it is necessary at a predetermined speed to supplement the dynamic braking with a large degree of electro-pneumatic braking.

At said predetermined chosen high speed when the dynamic brake begins to be ineffective to properly retard the vehicle, the degree of current output of the traction motor armature 85 is sufficient to cause pick-up of the current responsive relay 89 thereby opening contact 124 and closing contact 125 of said relay. This predetermined speed and corresponding predetermined traction motor armature current output is chosen at a speed of, for example, 40 miles per hour when the rate of deceleration effected by the dynamic braking begins to decrease at said high speed as is commonly known. At this predetermined speed it is desirable to supplement the dynamic braking with electro-pneumatic braking to achieve a constant effective braking effort. With the current responsive relay 89 energized and picked up as heretofore explained, and the contact 124 opened, the compensating coil 93 is deenergized such that the exciter coil 92 is the only remaining means for energizing the compensating magnet valve device 91. Energization of the compensating magnet valve device 91 by the exciter coil 92 only, is insufficient to maintain the compensating magnet operated valve 94 closed, and therefore said valve is dropped out or opened to permit fluid under pressure to flow from pipe 105 past said magnet valve 91 to pipe 106, double check valve 107, control pipe 108 to effect an electro-pneumatic braking in a degree as called for by the position of the cam shaft 73 in the application zone. Simultaneously with the opening of contact 124 of said relay 89, the closing of contact 125 completes a circuit from the battery supply 131 via wire 135, contact 125 and wire 136 to the magnet valve 102 and thence to ground to cause said magnet valve to pick up, in which position a passage (not shown) to atmosphere is closed off thereby closing atmospheric ports connected to pipe 104. With the apparatus so conditioned, an application position of the brakes is defined wherein the dynamic brake is in full effect and electro-pneumatic braking is effective.

If on the described downgrade, the speed of the vehicle continues to increase, likewise the traction motor armature speed increases respectively to a predetermined speed of for example 50 miles per hour, wherein the current output of the traction motor armature 84 is of a degree to cause pick-up of the current responsive relay 88 and its respective contact 121. With contact 121 picked-up in its closed position, a circuit is completed from the battery 131 by way of wire 135, contact 121 in its closed position and wire 137 to the magnet valve 101 and thence to ground to effect pick-up of the magnet valve 101. With the magnet valve 101 picked-up, a passage (not shown) through control device 100 is opened to permit main reservoir pressure to flow from main reservoir 99 via pipe 109 to pipe 103 through the control device 100 to pipe 104 to position the double check valve 107 such that a large amount of fluid under the high main reservoir pressure flows to pipe 108 and the master controller device 95 from pipe 104 to effect a large degree of electro-pneumatic braking in the well-known manner. This large amount of electro-pneumatic braking is effective to decrease the train speed below the predetermined speed of 50 miles per hour when said speed responsive relay 88 is dropped out opening contact 121 to deenergize the magnet valve 101 and thereby cut off supply of main reservoir pressure to pipe 104 and control pipe 108 and maintain a lap condition of the electro-pneumatic brakes. The lap condition of the electro-pneumatic brakes is maintained until the speed of the vehicle drops below a predetermined speed of 40 miles per hour and the rate of deceleration due to dynamic braking increases to produce a greater retardation effect at which time relay 89 is dropped out opening contact 125 to deenergize magnet valve 102 to open the previously mentioned passage to atmosphere (not shown) to vent pipe 104 and release the high fluid pressure in pipe 108 and cause a decrease in the electro-pneumatic braking. Simultaneously with opening of contact 125, the contact 124 is closed to permit the compensating coil 93 to again become effective to cause the compensating magnet valve 94 to close thereby preventing flow of fluid under pressure from pipe 105 to pipe 106 to permit the dynamic braking to be assisted by only the limited electro-pneumatic braking resultant from the fluid under pressure in pipes 106 and 108 at the time of closing of the compensating magnet operated valve 94. This condition exists until the speed drops below a third predetermined speed of, for example, 20 miles per hour and the retardation effect of the dynamic brake begins to decrease, at which time the compensating coil 93 is no longer energized by a current sufficient to maintain the compensating magnet operated valve 94 in its picked-up position and therefore the compensating magnet operated valve 94 will drop out to permit fluid under pressure from pipe 105 to flow past said compensating magnet operated valve 94 to the pipe 106 to effect operation of the electro-pneumatic brake under the control of the brake valve 72, thus giving an even transition from dynamic braking to electro-pneumatic braking at critical speeds.

Summary

It can thus be seen from the above description that the first embodiment of my invention shown in Fig. 1 provides a braking sequence for a moving vehicle as follows.

Initial movement of the brake pedal or handle (not shown) provides a degree of normal electro-pneumatic braking and a simultaneous dynamic braking in proportion to the degree of movement of said brake pedal. An increase in the degree of movement of the said brake pedal causes an increase in dynamic and electro-pneumatic braking effective until the compensating coil 14c is energized sufficiently to close the compensating magnet operated valve 15 to prevent any increase in the electro-pneumatic braking. As the speed of the vehicle decreases, the effective dynamic braking similarly decreases until the compensating coil 14c is deenergized sufficiently to cause the compensating magnet operated valve 15 to open to permit the electro-pneumatic braking to again become effective under the control of the brake valve 13. Thus, a constant braking force of a degree proportional to brake pedal movement is always maintained, said braking force consisting in the major part of dynamic braking when the speed of the vehicle is such that dynamic braking is effective and in the major part, of electro-pneumatic braking when the speed of the vehicle is such that dynamic brake is not sufficiently effective.

The second embodiment of my invention provides a braking sequence wherein initial movement of the brake pedal (not shown) results in a total braking force proportionate to the degree of movement of said pedal, said total braking force resultant from both electro-pneumatic braking means and dynamic braking means. As the brake pedal is further moved into the application zone, the resultant total braking force is likewise increased in proportion to the increased degree of movement of said pedal. However, as this braking force is increased, the dynamic braking becomes more effective and the electro-pneumatic brake is limited by the compensating magnet valve device 94. If on a downgrade condition where the rate of deceleration effected by the dynamic braking is ineffective to retard the train and the train speed increases to a high speed, the rate of deceleration effected by the dynamic braking begins to decrease and the dynamic braking current continues to increase, until at a first predetermined high speed, for example 40 m.p.h., the dynamic braking current has increased to a degree sufficient to cause a first current responsive relay to be picked up to effect opening of the compensating magnet operated valve 94 to supplement the dynamic braking with the electro-pneumatic braking to a degree determined by the positioning of the cam shaft 73 in the application zone. As the speed increases beyond said first predetermined speed, the rate of deceleration effected by the dynamic braking further decreases until at a second predetermined speed, for example 50 m.p.h., the dynamic braking current has increased to a degree sufficient to cause a second current repsonsive relay to be picked up to cause the high main reservoir pressure to be supplied to the master controller 95 to effect a large increase in the proportion of electro-pneumatic braking utilized in obtaining the total effective braking force. This large increase in effective electro-pneumatic braking results in the speed decreasing below said second predetermined speed of 50 m.p.h. at which time the two mentioned current responsive relays cooperate to provide a lapped position of electro-pneumatic braking until the speed drops below the first predetermined speed of 40 m.p.h. At the time speed drops below said 40 m.p.h., fluid under pressure in the control pipe 108 is vented to atmosphere to decrease the effective electro-pneumatic braking and the compensating magnet operated valve 94 is closed to limit the electro-pneumatic braking to that resultant from the fluid under pressure in pipe 106 at the time said magnet operated valve is closed, and the dynamic brake becomes the more effective brake in obtaining the total effective braking force. Further decrease in the speed results in decreased effective dynamic braking and the just described limited electro-pneumatic braking until at a third predetermined speed, for example 20 m.p.h., when the dynamic braking retardation force becomes ineffective, the dynamic braking current is of such a small degree as to permit the compensating magnet operated valve 94 to open to permit the electro-pneumatic braking to be effective under control of the brake valve 72.

From the above description of the two embodiments it may be seen that I have provided a total effective braking force in amount proportionate to the degree of movement of the brake pedal, said braking force consisting of both dynamic brake and electro-pneumatic braking and being predominantly dynamic in the speed ranges where dynamic braking is effective and predominantly electro-pneumatic when dynamic braking is ineffective, with an even transition from one type of braking to the other when necessary.

Having now described the invention, what I claim as new and desire to secure by Letters Patent, is:

1. A brake system for a vehicle comprising in combination a dynamic braking means for generating a dynamic braking current commensurate to the degree of dynamic braking obtained, fluid pressure operated braking means, a control pipe, self-lapping fluid pressure responsive switch means operable responsively to fluid under pressure in said control pipe, fluid pressure reservoir means, electro-magnetic valve means operatively controlled by said switch means to control supply of fluid under pressure from said fluid pressure reservoir means to the said fluid pressure operated brake means to effect operation of the said fluid pressure operated braking means, a source of fluid under pressure, a delivery pipe, brake valve means operative to supply fluid under pressure from said source to said delivery pipe, a current-responsive valve means, and means for electrically connecting said current-responsive valve means to the dynamic braking means, said current-responsive valve means normally establishing communication between said delivery pipe and said control pipe and being operable responsively to a dynamic braking current exceeding a predetermined degree to interrupt the communication between said delivery pipe and said control pipe.

2. A brake system for a vehicle comprising in combination, dynamic braking means operative to generate a dynamic braking current in a dynamic braking circuit commensurate to the degree of dynamic braking attained, fluid pressure operated braking means, a control pipe adapted to be supplied with fluid under pressure, self-lapping fluid pressure responsive switch means operable responsively to varied degrees of fluid under pressure in said control pipe, auxiliary reservoir means, electro-magnetic valve means operatively controlled by said switch means to control supply of fluid under pressure from said auxiliary reservoir means to the said fluid pressure operated brake means to effect operation of said fluid pressure operated braking means, a main reservoir, a delivery pipe, a source of electrical energy, a combined manually operated dynamic brake controller and self-lapping brake valve device operable simultaneously to control supply of electrical energy from said source to said dynamic braking circuit and to control the supply of fluid under pressure from said main reservoir to said delivery pipe, and a current-responsive magnet valve means having a first coil means energized under the control of said brake valve device during a brake application by a certain uniform current supplied from said source of electrical energy and a second coil means electrically connected to said dynamic braking means and energized in varying degree by said dynamic braking current, both said first coil means and said second coil means being effective when energized to exert a magnetic force in the same direction, said magnet valve means normally establishing communication between said delivery pipe and said control pipe and being operable responsively to the combined effort of said second coil means when energized by a dynamic braking current exceeding a predetermined degree and of said first coil means to interrupt the communication between said delivery pipe and said control pipe.

3. A brake system for a vehicle comprising in combination, dynamic braking means operative to generate a dynamic braking current in a dynamic braking circuit commensurate to the degree of dynamic braking attained, fluid pressure operated braking means, a control pipe adapted to be supplied with fluid under pressure, self-lapping fluid pressure responsive switch means operable responsively to varied degrees of fluid under pressure in said control pipe, auxiliary reservoir means, electro-magnetic valve means operatively controlled by said switch means to control supply of fluid under pressure from said auxiliary reservoir means to the said fluid pressure operated brake means to effect operation of the fluid pressure operated braking means, a main reservoir, a delivery pipe, two separate sources of electrical energy, a combined manually operated dynamic brake controller and self-lapping brake valve device operable to control a supply of electrical energy from one of said sources to the dynamic braking circuit and simultaneously to control the supply of fluid under pressure from said main reservoir to said delivery pipe, and a current-responsive magnet valve means having a first coil means energized under the control of said brake valve device during a brake application by a certain uniform current supplied from the second of said sources of electrical energy and a second coil means electrically connected to the dynamic braking means and energized in varying degree by the dynamic braking current, both said first coil means and said second coil means being effective when energized to exert a magnetic force in the same direction, said magnet valve means normally establishing communication between said delivery pipe and said control pipe and being operable responsively to the combined efforts of said second coil means when energized by a dynamic braking current exceeding a predetermined degree and of said first coil means to interrupt said communication between said delivery pipe and said control pipe.

4. A brake system for a vehicle comprising in combination a dynamic braking means operative to generate a dynamic braking current commensurate to the degree of dynamic braking attained, fluid pressure operated braking means, manually operated brake valve means, a source of supply of fluid under pressure, a control pipe, self-lapping fluid pressure responsive switch means operable responsively to fluid under pressure in said control pipe, auxiliary reservoir means, electromagnetic valve means operatively controlled by said switch means to control supply of fluid under pressure from said auxiliary reservoir means to the said fluid pressure operated brake means to control the degree of application of fluid pressure braking, a first delivery pipe operative to deliver fluid under pressure below a predetermined maximum fluid pressure from said source of supply to said control pipe under the control of said brake valve means, current-responsive valve means, means for electrically connecting said current-responsive valve means to the dynamic braking means, said current-responsive valve means being operable responsively to a predetermined degree of energization by said dynamic braking current to prevent delivery of fluid under pressure from said first delivery pipe to said control pipe while said dynamic braking means is operable effectively, a second delivery pipe connected directly to said source of supply and operative to deliver fluid under pressure directly from said source of supply to said control pipe at a pressure greater than said predetermined maximum fluid pressure while said dynamic braking means is operably ineffective, and valve means interconnecting said second delivery pipe and said control pipe and operable responsively to supply of fluid under pressure in said second delivery pipe when said dynamic braking tends to become ineffective due to high vehicle speeds to terminate delivery of fluid under pressure from said first delivery pipe to said control pipe and permit delivery of fluid under pressure to said control pipe from said second delivery pipe.

5. A brake system for a vehicle comprising in combination a dynamic braking means operative to generate a dynamic braking current commensurate to the degree of dynamic braking attained, fluid pressure operated braking means, a source of supply of fluid at a certain pressure, a first delivery pipe, brake valve means for controlling the supply of fluid under pressure from said source to said first delivery pipe at pressures varying up to a certain maximum pressure less than said certain pressure in said source, a control pipe, self-lapping fluid pressure responsive switch means operable responsively to fluid under pressure in said control pipe, auxiliary reservoir means, electro-magnetic valve means operatively controlled by said switch means to control supply of fluid under pressure from said auxiliary reservoir means to the said fluid pressure operated brake means to control the degree of said fluid pressure operated braking, current-responsive valve means, means for electrically connecting said current-responsive valve means to the dynamic braking means, said current-responsive valve means normally establishing communication between said first delivery pipe and said control pipe and being operable responsively to a first dynamic braking current exceeding a first predetermined degree to interrupt the communication between said first delivery pipe and said control pipe, a second delivery pipe charged with fluid at the said certain pressure in said source, control valve means electrically connected to said dynamic braking means and operative in response to a second predetermined dynamic braking current to control delivery of fluid at said certain pressure from said second delivery pipe to said control pipe, and check valve means operable responsively to supply of fluid at said certain pressure from said second delivery pipe to said control pipe to terminate delivery of fluid under pressure from said first delivery pipe to said control pipe.

6. A brake system for a vehicle comprising in combination, a dynamic braking means operative to generate a dynamic braking current commensurate to the degree of dynamic braking attained, fluid pressure operated braking means, a source of supply of fluid at a certain pressure, a first delivery pipe, brake valve means for controlling the supply of fluid under pressure from said source to said first delivery pipe at pressures varying up to a certain maximum pressure less than said certain pressure in said source, a control pipe, self-lapping fluid pressure responsive switch means operable responsively to fluid under pressure in said control pipe, auxiliary reservoir means, electro-magnetic valve means operatively controlled by said switch means to control supply of fluid under pressure from said auxiliary reservoir means to the said fluid pressure operated brake means to control the degree of fluid pressure operated braking, current-responsive valve means electrically connected to said dynamic braking means and operable when energized by a predetermined dynamic braking current to prevent delivery of fluid under pressure from said first delivery pipe to said control pipe and operable when deenergized to permit delivery of fluid under varied degrees of pressure from said delivery pipe to said control pipe within limits of said certain pressure, a normally vented branch control pipe adapted to be placed in communication with said control pipe, a second delivery pipe charged with fluid at said certain pressure from said source of supply, valve means operable responsively to a supply of fluid under said certain pressure in said branch control pipe to terminate delivery of fluid under pressure from said first delivery pipe to said control pipe and establish communication between said branch control pipe and said control pipe, a source of electrical energy, electrically controlled valve means having a first magnet valve means electrically controlled by said dynamic braking means and operable when energized by said source of electrical energy to prevent venting of said branch control pipe and a second magnet valve means electrically controlled by said dynamic braking means and operable when energized by said source of electrical energy to permit supply of fluid under said certain pressure from said second delivery pipe to said branch control pipe and said control pipe, and relay means operable responsively to different degrees of dynamic braking currents generated at predetermined vehicle speeds to control energization of said first and second magnet valve means by said source of electrical energy.

References Cited in the file of this patent

UNITED STATES PATENTS

| | | |
|---|---|---|
| 1,440,499 | Simmon | Jan. 2, 1923 |
| 2,038,174 | Hewitt | Apr. 21, 1936 |
| 2,084,680 | Grosswege et al. | June 22, 1937 |
| 2,130,621 | Hewitt | Sept. 20, 1938 |
| 2,165,999 | Farmer | July 11, 1939 |
| 2,177,529 | Larson | Oct. 24, 1939 |
| 2,234,897 | Eaton | Mar. 11, 1941 |
| 2,243,068 | Blue et al. | May 27, 1941 |
| 2,656,222 | Hines | Oct. 20, 1953 |